United States Patent
Harral

(10) Patent No.: US 10,344,862 B2
(45) Date of Patent: Jul. 9, 2019

(54) SHAFT COUPLING SEAL ASSEMBLY

(71) Applicant: Rolls-Royce Corporation, Indianapolis, IN (US)

(72) Inventor: Jacob W. Harral, Brownsburg, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 725 days.

(21) Appl. No.: 14/990,336

(22) Filed: Jan. 7, 2016

(65) Prior Publication Data

US 2016/0201801 A1 Jul. 14, 2016

Related U.S. Application Data

(60) Provisional application No. 62/102,379, filed on Jan. 12, 2015.

(51) Int. Cl.
*F16J 15/324* (2016.01)
*F16J 15/06* (2006.01)
(Continued)

(52) U.S. Cl.
CPC .......... *F16J 15/062* (2013.01); *F01D 25/183* (2013.01); *F16C 3/03* (2013.01); *F16D 1/10* (2013.01);
(Continued)

(58) Field of Classification Search
CPC ........ F16J 15/061; F16J 15/062; F16J 15/164; F16J 15/32; F16J 15/34; F16J 15/3404;
(Continued)

(56) References Cited

U.S. PATENT DOCUMENTS 3,197,216 A 7/1965 Jackson
3,603,602 A 9/1971 Padula
(Continued)

FOREIGN PATENT DOCUMENTS

DE 7825497 U1 12/1978
EP 2698567 A1 2/2014
EP 2787255 A1 10/2014

OTHER PUBLICATIONS

Communication Pursuant to Article 94(3) EPC—Examination of European Patent Application dated Apr. 25, 2017 related to corresponding European Patent Application No. 16 150 526.8.
(Continued)

*Primary Examiner* — Michael P Ferguson
(74) *Attorney, Agent, or Firm* — Fishman Stewart PLLC

(57) ABSTRACT

A sealing element for a shaft coupling is disclosed. The sealing element may include an annular seal body and a plurality of projections circumferentially spaced around the seal body. One or more of the plurality of projections may include at least one of an axial component extending longitudinally in an axial direction from the seal body and/or a radial component extending radially inwards from the seal body towards the center axis. The sealing element is configured to retrofit into existing standard o-ring grooves and provides optimal lubrication, for example in a spline joint, by keeping the spline joint contact area submerged in lubricant and includes heat and debris removal with lubricant flow-through.

8 Claims, 3 Drawing Sheets

(51) Int. Cl.
| | |
|---|---|
| *F01D 25/18* | (2006.01) |
| *F16D 1/10* | (2006.01) |
| *F16C 3/03* | (2006.01) |
| *F16J 15/32* | (2016.01) |

(52) U.S. Cl.
CPC .......... *F16J 15/32* (2013.01); *F05D 2220/32* (2013.01); *F05D 2240/55* (2013.01); *F05D 2240/60* (2013.01); *F05D 2260/403* (2013.01); *F05D 2260/98* (2013.01); *F16D 2001/103* (2013.01)

(58) Field of Classification Search
CPC ...... F16J 15/3464; F16J 15/064; F16J 15/447; F16J 15/4472; F16J 15/4476; F16J 15/324; F16J 15/3284; Y10T 403/7026; Y10T 403/7033; Y10T 403/7035; Y10T 403/52
USPC .................................. 277/372, 373, 911, 912
See application file for complete search history.

(56) References Cited

U.S. PATENT DOCUMENTS

| | | | |
|---|---|---|---|
| 3,647,229 A | 3/1972 | Grimes | |
| 3,756,126 A | 9/1973 | Granada | |
| 4,729,569 A * | 3/1988 | Muller | F16J 15/164 |
| | | | 277/584 |
| 4,850,521 A | 7/1989 | Servant | |
| 4,921,258 A * | 5/1990 | Fournier | F16J 15/164 |
| | | | 137/217 |
| 6,561,522 B1 | 5/2003 | Radelet et al. | |
| 6,629,816 B2 * | 10/2003 | Langston | F16J 15/164 |
| | | | 277/352 |
| 6,631,908 B2 | 10/2003 | Mittler et al. | |
| 6,655,697 B2 | 12/2003 | Heraud et al. | |
| 6,685,193 B2 | 2/2004 | Roberts et al. | |
| 6,688,608 B2 | 2/2004 | Doyle | |
| 6,722,660 B2 | 4/2004 | Gernand et al. | |
| 6,981,704 B2 | 1/2006 | Okazaki et al. | |
| 7,252,292 B2 | 8/2007 | Panelli et al. | |
| 7,252,293 B2 | 8/2007 | Happel | |
| 7,306,234 B2 | 12/2007 | Franz et al. | |
| 2008/0265523 A1 | 10/2008 | Galpin | |
| 2011/0140368 A1 * | 6/2011 | Keck | F16J 15/164 |
| | | | 277/500 |

OTHER PUBLICATIONS

Communication Pursuant to Article 94(3) EPC—Examination of European Patent Application dated Dec. 15, 2017 related to corresponding European Patent Application No. 16 150 526.8.
European Search Report dated Jun. 14, 2016 issued in EP Application No. 16150526.8.

* cited by examiner

SHAFT COUPLING SEAL ASSEMBLY

CROSS-REFERENCE TO RELATED APPLICATIONS

This application claims priority to U.S. Provisional Patent Application No. 62/102,379 filed on Jan. 12, 2015, the contents of which are hereby incorporated by reference in its entirety.

GOVERNMENT RIGHTS

This invention was made with government support under FA8650-07-C-2803 awarded by the U.S. Department of the Air Force. The government has certain rights in the invention.

FIELD OF TECHNOLOGY

A sealing system for machinery, and in particular, a sealing element otherwise referred to as a JED (Jake's Elastomer Dam) seal that provides optimal lubrication as well as heat and debris removal for a connection between a male end of a first piece and a female end of a second piece.

BACKGROUND

Vehicles, such as aircrafts, and other machinery employ seals to connect static and moving parts within the machinery and to control a fluid flow between the parts. In a gas turbine engine, seals are located in numerous locations such as on rotors, input shafts, output shafts, etc., and can be used in numerous systems such as motors, generators, transmissions and gearbox assemblies to name a few.

According to one implementation, seals may be employed in a spline joint connecting two rotatable members. The seal may be arranged at an interface between a spline shaft and a sleeve shaft, such as on a driveshaft or a propshaft. The spline area is provided with a lubricating fluid, such as oil, in an attempt to reduce wear on the spline joint teeth. However, merely allowing a lubricating fluid to pass over the splines may be inadequate because the lubricating fluid is thrust outwardly or radially from the rotating members due to high rotational speeds and loads such that the contact area of the spline teeth experience insufficient lubrication.

In order to improve the service life of the spline joint, a seal, such as an o-ring seal, has been employed to form a barrier on one side of the spline joint thereby halting the fluid flow in an effort keep the spline area submerged in the lubricating fluid. However, these seals provide a fluid-tight connection with no ability to permit the lubricating fluid to flow-through and exit the spline joint. As such, heat generated due to misalignment or operating conditions cannot be removed and debris generated by spline wear is trapped thereby reducing component part life and accelerating wear. Moreover, dirt or other debris may be trapped at the interface which may potentially reduce the service life of the spline joint.

Accordingly, there is an established need for a seal that lubricates a spline joint effectively and permits the lubricating fluid to flow-through the spline joint providing cooling and debris removal, while providing a relatively simple and economical construction.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

An exemplary sealing element or JED seal for a connection between a male shaft and a female shaft is described herein and is shown in the attached drawings. The sealing element includes an annular seal body defining an outer diameter surface and a radially opposite inner diameter surface; and a leading side and an axially opposite trailing side relative to a center axis of the seal body. The sealing element may include a plurality of projections circumferentially spaced around the inner diameter surface of the seal body. One or more of the plurality of projections may include at least one of an axial component extending longitudinally in an axial direction from the seal body and/or at least one radial component extending radially inwards from the seal body towards the center axis.

The sealing element may be utilized in a shaft-to-shaft coupling, for example a spline joint, arranged in a groove, channel or recess formed on at least one of an outer shaft and an inner shaft. By way of the configuration of the seal body and the one or more projections extending therefrom, the sealing element can be retrofitted into existing grooves, e.g., standard o-ring grooves, thereby achieving savings with respect to costs and installation.

The exemplary sealing element is configured to control fluid flow sufficient to dam a lubricating fluid to provide adequate lubrication upstream the sealing element while, due to the one or more projections or bumps on the seal body, allowing the lubricating fluid to flow through providing cooling and debris removal. The sealing element can be installed into pre-existing grooves formed on a shaft (e.g., existing o-ring grooves) and does not require an adhesive to fix the sealing element in position for installation or operation.

The following discussion is but one non-limiting example of an improved sealing element for use in a gas turbine engine. It will be appreciated that the disclosed sealing element may be used in other machinery.

Figure 1:
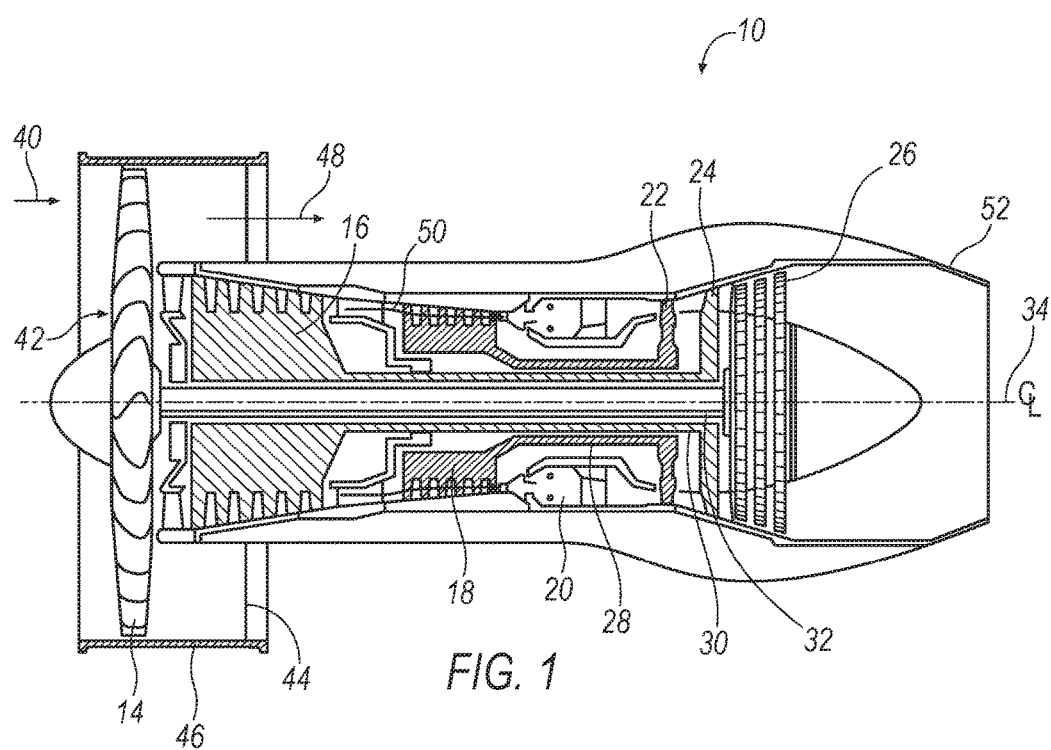
FIG. 1 illustrates a schematic view of a gas turbine engine employing the improvements discussed herein.

Now turning to the drawings, FIG. 1 illustrates a gas turbine engine 10, which includes a fan 14, optionally a non-shown low pressure compressor ("LP compressor"), intermediate pressure compressor 16 ("IP compressor"), a high pressure compressor 18 ("HP compressor"), a combustor 20, a high pressure turbine 22 ("HP turbine"), an intermediate pressure turbine 24 ("IP turbine") and low pressure turbine 26 ("LP turbine"). The HP compressor 18, the IP compressor 16 and the fan 14 are connected to a respective one of an HP shaft 28, an IP shaft 30 and an LP shaft 32, which in turn are connected to a respective one of the HP turbine 22, the IP turbine 24 and the LP turbine 26. The shafts extend axially and are parallel to a longitudinal center line axis 34. While FIG. 1 illustrates a three shaft engine, it will be appreciated that other embodiments can have configurations including more or less than three shafts. During general operation of the engine 10, ambient air 40 enters the annular duct 44 and is directed across the fan 14 in the annular duct 44, which in part is circumscribed by fan case 46. The bypass airflow 48 provides a portion of engine thrust while the primary gas stream 50 is directed to the combustor 20 and the turbines 22, 24, 26, and then exhausted through a nozzle 52 generating thrust.

The exemplary turbine engine 10 may include one or more shaft-to-shaft connections in which a male shaft has splines that mesh with female splines in a mating piece (e.g., a shaft) to transfer torque to it. For example, the turbine engine 10 may be operably coupled to a constant speed drive and/or an accessory gearbox to drive mechanisms, such as a starter motor, an electrical generator, fuel pump, oil pump, hydraulic pump, etc. The accessory gearbox, for example, may include mount pads with splined shaft joints to power drive mechanisms. A skilled artisan will appreciate the disclosure contemplates spline joints applicable in a variety of machinery, including but not limited a powerplant (e.g., engine, transmission, drivetrain, power take-off, final drive, etc.) in aircrafts, automotive vehicles, locomotives, watercrafts, etc.

Figure 2:
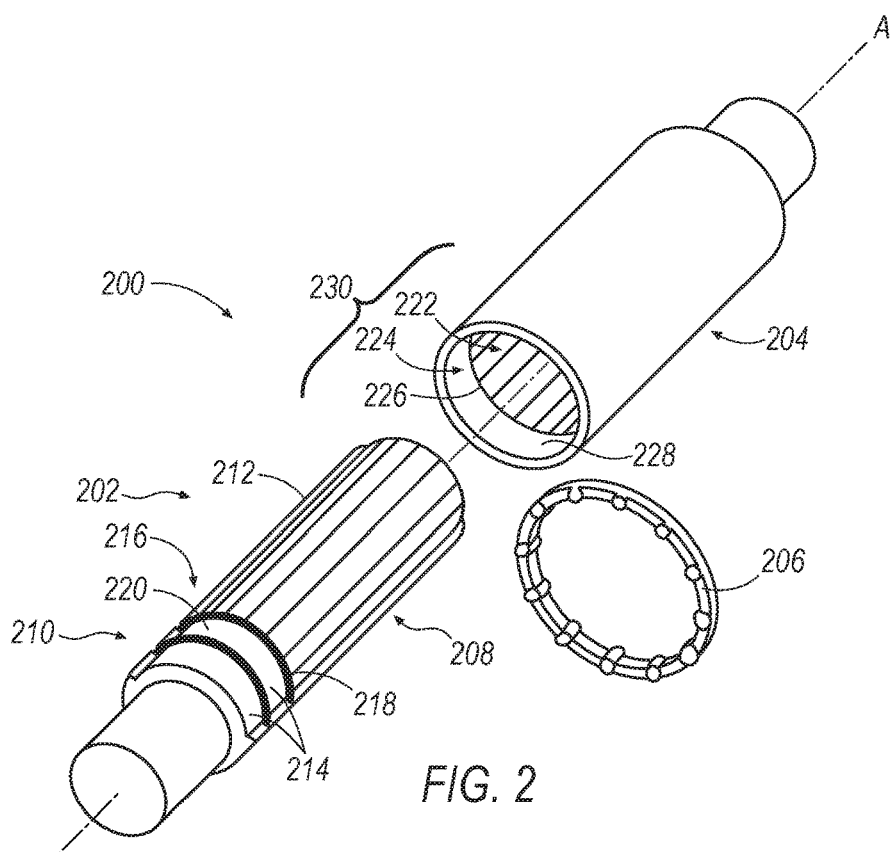
FIG. 2 illustrates a schematic perspective exploded view of a spline joint assembly according to one example.

Turning now to FIG. 2, there is illustrated a perspective exploded view of an exemplary spline joint assembly 200. The spline joint assembly 200 may include a male or inner or spline shaft 202 (generally referred to as a "male shaft") that may be received concentrically in a female or outer or sleeve shaft 204 (generally referred to as a "female shaft") and a sealing element 206 to control lubrication between the male shaft 202 and the female shaft 204.

The male shaft 202 may include a spline portion 208 and a cylindrical portion 210 adjacent to the spline portion 208. The spline portion 208 may include a plurality of circumferentially spaced splines 212 (e.g., ridges and/or grooves) extending in rows axially along a longitudinal center axis A. The splines 212 may be formed in various sizes and geometries as desired. The cylindrical portion 210 of the male shaft 202 may define an outer surface 214 having a first outer diameter $d_1$. A circumferential groove, channel or recess 216 (hereinafter "groove") may be formed in the cylindrical portion 210 and extend in a circumferential direction around the outer surface 214. The groove 216 may be raised from the outer surface 214 or depressed in the outer surface 214. According to one implementation, the groove 216 may include two axially spaced ridges 218 extending at least one of radially and obliquely to the outer surface 214 and a base 220 arranged between the pair of ridges 218. The base 220 may define a second outer diameter $d_2$, which may be less than, equal to, or greater than first outer diameter $d_1$. Although the groove 216 is shown as formed on the inner, male shaft 202, a skilled artisan will appreciate that the groove 216 may be formed on the outer, female shaft 204 without departing from the disclosure.

The female shaft 204 may include a complementary splined portion 222 having a profile (e.g., splines 212) matching the splines 212 of the male shaft 202 to transfer torque between the male and female shaft 202, 204. The female shaft 204 may include a counterbore 224 merging with a shoulder 226 in a region where the counterbore 224 meets the splined portion 222 of the female shaft 204. The counterbore 224 may have a generally cylindrical surface that defines an inner surface 228 for receiving the cylindrical portion 210 of the male shaft 202. The sealing element 206 may be disposed in the groove 216 between an interface 230 of the cylindrical portion 210 and the counterbore 224 of the male and female shaft 202, 204, respectively.

Figure 3:
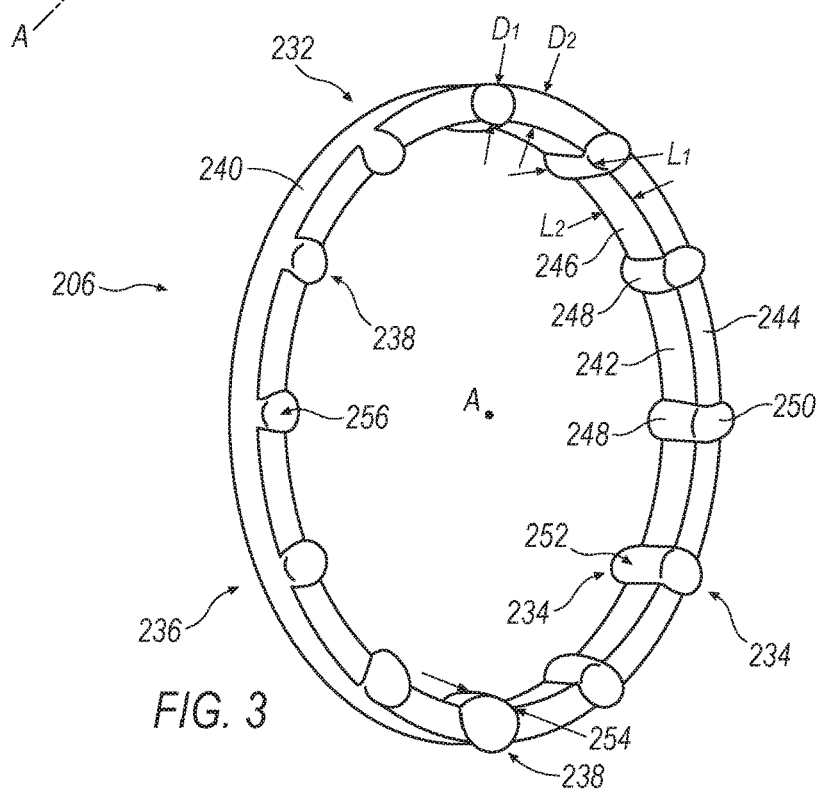
FIG. 3 illustrates a perspective view of an exemplary sealing element for the spline joint assembly of FIG. 2.

Turning now to FIG. 3, pursuant to an implementation the sealing element 206, by and large, may include a sealing portion 232 and a mounting portion 234. The sealing portion 232 may interact with either the male shaft 202 or the female shaft 204 to generate a fluid-tight seal to control lubrication and facilitate/control damming of a lubricating fluid such as oil relative to a flow direction. In the illustrated example, the sealing portion 232 interacts with the outer, female shaft 204 to generate an outer seal. The mounting portion 234 may mount and position the sealing element 206 relative to the male shaft 202 and/or the female shaft 204, e.g., in the groove 216. Pursuant to the disclosed example, the mounting portion 234 interacts with the inner, male shaft 202, e.g., via at least one of the ridges 218 and the base 220 of the groove 216. Additionally or alternatively, the mounting portion 234 may permit a fluid flow of the lubricating fluid to flow around the sealing element 206 thereby removing debris trapped in the interface 230 as well as allowing cooler lubricant to flow into the interface 230. The mounting portion 234, therefore, may function both to position the sealing element 206 and permit a flow through of the lubricating fluid to reduce wear on the spline joint assembly 200. Accordingly, the sealing element 206 dams the lubricating fluid to provide sufficient lubricant covering the contact area of the splined portions 208, 222 via the sealing portion 232 while providing a fluid-flow area to permit a desired volumetric through-flow of the lubricating fluid to flow past the sealing element 206, thereby allowing heated lubricating fluid to be replaced with relatively cooler lubricating fluid and removal of debris via the mounting portion 234.

As shown, the sealing element 206 includes an annular seal body 236 and a plurality of circumferentially spaced projections 238 disposed on the seal body 236. The seal body 236 and/or the projections 238 may be composed of many different materials having desirable material properties, including but not limited to elasticity, resiliency, rigidity, deformability, high thermal resistance, or any combination thereof. For example, the sealing element 206 (e.g., the seal body 236 and/or the projections 238) may be formed from vulcanized elastomers or thermoplastic elastomer (TPE) class materials. Further, the seal body 236 and the projections 238 may be formed of different materials. The projections 238 can have a higher rigidity than the seal body 236 to assist in mounting the sealing element 206 in position. According to one implementation, the sealing element 206 may be composed of material having a density greater than or equal to a density of a lubricant (e.g., oil or some other type of coolant) to facilitate generating a seal with the complementary surface of the male shaft 202 or female shaft 204, as described in more detail below.

The seal body 236 may be annular and define an outer diameter face or surface 240 and a radially opposite inner diameter face or surface 242, and a leading or upstream side 244 (generally referred to as a "leading side") and an axially opposite trailing or downstream side 246 (generally referred to as a "trailing side"), relative to the center axis A. The leading side 244 and the trailing side 246 may be determined by the direction of the fluid flow (e.g., leading side 244 is upstream and receives the inflow of lubricant). The seal body 236 may have a generally quadrilateral cross-section as shown, or may include a cross-section defining a circle, hexagon, heptagon, etc. without departing from the disclosure.

The outer diameter surface 240 may include a generally flat and/or smooth profile to facilitate a fluid-tight seal between the sealing element 206 and the inner surface 228 of the female shaft 204. The outer diameter surface 240 may be configured to allow sufficient compression against the inner surface 228 of the female shaft 204 to both generate a seal and compensate for manufacturing tolerances of the inner surface 228. For example, the outer diameter surface 240 may include a smooth, crowned profile configured to compress at least partially in response to an opposite resisting force of the inner surface 228 of the female shaft 204.

The inner diameter surface 242, the leading side 244 and/or the trailing side 246 of the seal body 236 may likewise include a generally smooth and/or flat profile configured to support the plurality of projections 238.

The projections 238 may be circumferentially spaced at predetermined intervals along the seal body 236, and may be formed from elastic, deformable material configured to withstand high thermal conditions and resistance to wear. The projections 238 may be formed in various sizes and shapes as desired for a particular application. In the illustrated example, the projections 238 are substantially oval in cross-section. However, the projections 238 may be formed in a variety of shapes, including but not limited to triangular, quadrangular, heptagonal, etc.

The projections 238 may respectively include at least one of a radial component 248 extending from the inner diameter surface 242. Additionally or alternatively, the respective projections 238 may include an axial component 250 extending from the leading side 244 and/or the trailing side 246 of the seal body 236. That is, the respective projections 238 may be composed of a radial component 248 extending radially inwards from the inner diameter surface 242 and/or at least one axial component 250 extending axially away from the leading and/or trailing sides 244, 246. According to one implementation, at least one respective projection 238 may include a radial component 248 and an axial component 250 extending from each side thereof. Additionally or alternatively, at least one projection 238 may include a radial component 248 solely and at least one other projection 238 may include an axial component 250 solely extending from at least one of the leading side 244 and the trailing side 246.

The radial components 248 may extend radially inwards a predefined radial extent from the inner diameter surface 242 of the seal body 236 in a direction towards the center axis A and may respectively define a radial mounting face 252. The radial mounting face 252 may align the sealing element 206 on the male shaft 202, e.g., via the groove 216, and in conjunction with the radial component 248 prevents the seal body 236 from pressing radially on the groove 216 in desired or predefined positions. Accordingly, two circumferentially adjacent radial components 248 may define a radial gap 254 between the inner diameter surface 242 of the seal body 236 and the base 220 of the groove 216 that represents a fluid-flow area configured to permit a fluid (e.g., a lubricant) to flow past the inner diameter surface 242 of the seal body 236. Thus, the sealing element 206 may define a cross-section including a first radial extent $h_1$ in a region of the radial component 248 (e.g., between the outer diameter surface 240 and the radial mounting face 252) that is greater than a second radial extent $h_2$ in a region spaced circumferentially away from the radial component 248 (e.g., between the outer diameter surface 240 and the inner diameter surface 242).

The axial components 250 may extend axially from at least one of the leading side 244 and the trailing side 246 of the seal body 236 and may define an axial mounting face 256 on the respective axial ends thereof. In the example illustrated in FIG. 3, the axial components 250 extend from both the leading side 244 and the trailing side 246 to form a unitary projection 238 in conjunction with the radial component 248. According to another example, the axial components 250 may alternate in the circumferential direction of the sealing body 236 between extending from the leading side 244 and the trailing side 246. The axial components 250 may be configured to prevent the associated leading side 244 and trailing side 246 of the seal body 236 from forming an axial seal with the corresponding groove 216, in particular the ridges 218. That is, the axial components 250, e.g., circumferentially adjacent components, may be configured to establish an axial gap 258 (see FIG. 4) associated with the leading side 244 and trailing side 246, respectively, configured to permit the lubricating fluid to flow around the seal body 236. As such, the axial gap 258 together with a corresponding radial gap 254 may define at least partially a fluid-flow area permitting the lubricant and debris to flow out of the groove 216. The axial components 250 may extend from the leading side 244 and the trailing side 246 a predetermined axial extent sufficient to prevent the seal body 236 from pressing axially on the groove 216 and therefore maintain the axial gaps 258 (see FIG. 4) between adjacent axial components 250. According to an implementation, the sealing element 206 may define a cross-section including a first axial extent $L_1$ in a region of the axial component 250 (e.g., between the axial mounting face 256 on the leading side 244 and the axial mounting face 256 on the trailing side 246) that is greater than a second axial extent $L_2$ in a region spaced away from the axial component 250 (e.g., between the leading side 244 and the trailing side 246 of the seal body 236).

Pursuant to the example illustrated in FIG. 3, the sealing portion 232 of the sealing element 206 may include the outer diameter surface 240 of the seal body 236. The mounting portion 234 of the sealing element 206 may include the associated projections 238 (e.g., the radial components 248 and the axial components 250) extending therefrom, while a dam of lubricant flow may be formed via the inner diameter surface 242, the leading side 244 and the trailing side 246, as will be discussed in more detail below.

According to one implementation, the sealing element 206 may be formed from injection molding a desired material (e.g., elastomers such as vulcanized elastomer, TPE class materials, synthetic rubber such as fluoroelastomers and neoprene, silicon or any other suitable material) into a mold cavity having predetermined dimensional attributes corresponding to desired dimensional attributes for the sealing element 206. The predetermined dimensional attributes may include, but are not limited to, an outer diameter of the seal body 236, an inner diameter of the seal body 236, an axial extent of the seal body 236 from the leading side 244 to the trailing side 246, a quantity of projections 238 disposed on the seal body 236, a distance between adjacent projections 238 in a circumferential direction, a shape of the projections 238, an axial extent of the axial component 250 extending from the leading side 244 and/or the trailing side 246 and a radial extent of the radial component 248 extending from the inner diameter surface 242. Unlike some existing seals that are bulky and/or require custom grooves on the outer female shaft 204, for example, the sealing element 206 can be designed to fit into pre-existing grooves on one of the shafts. Accordingly, space savings can be achieved as the sealing element 206 can be formed to occupy less space than traditional seals, for example weir seals. In this regard, an existing inner male shaft 202 and/or an outer female shaft 204 having a preformed groove can be retrofitted with the sealing element 206, which may not be possible with other, more bulky seals. Additionally, unlike some existing seals that may only be fitted into a groove on the outer female shaft (e.g., weir seals), the disclosed sealing element 206 may be properly positioned into existing grooves on the inner male shaft (e.g., pre-existing o-ring seal grooves). Accordingly, cost savings can be achieved because the existing shafts and grooves can be retrofitted with the sealing element 206.

Figure 4:
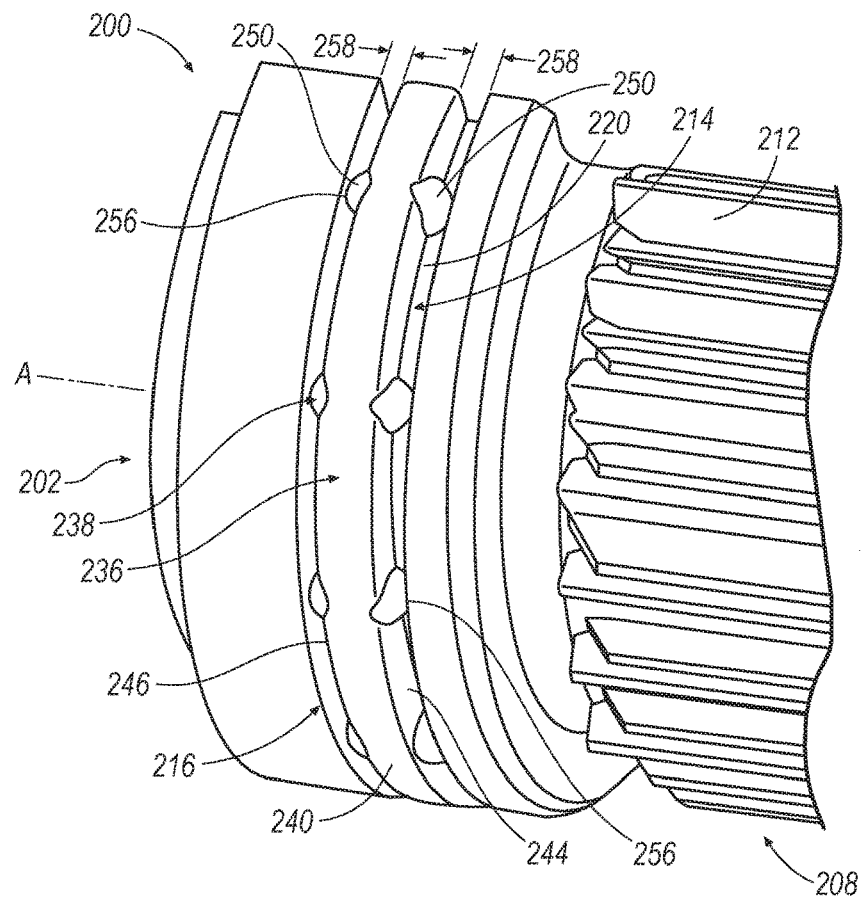
FIG. 4 illustrates a sectional perspective view of the spline joint assembly with the female shaft removed for illustrative purposes.

FIG. 4 illustrates a sectional perspective view of the exemplary spline joint assembly 200 with the female shaft 204 removed for illustrative purposes. The exemplary sealing element 206 according to this example is arranged in an industry standard o-ring seal groove 216 extending circumferentially about the cylindrical portion 210 of the male shaft 202. The outer diameter surface 240 of the seal body 236 may engage the inner surface 228 of the counterbore 224 (cf. FIG. 2) to form an outer radial fluid-tight seal relative to the center axis A (e.g., an axis of rotation). The outer diameter surface 240 of the seal body 236 may have dimensions that are approximately the same as or slight larger than the dimensions of inner surface 228 to obtain a desired squeeze of the seal body 236 against the inner surface 228 of the female shaft 204, e.g., the outer diameter surface 240 may be compressed against the inner surface 228 to facilitate a press fit. Further, the dimensions and deformable attributes of the sealing element 206 may help compensate for connection misalignments between the male shaft 202 and female shaft 204.

The radial components 248 may mount the sealing element 206 on the male shaft 202, e.g., via the respective radial mounting faces 252. The mounting faces 252 of the radial components 248 may define an inner diameter that has approximately the same dimensions as the second outer diameter $d_2$ of the base 220 of the groove 216. The radial components 248 also function to lift the inner diameter surface 242 of the seal body 236 from the base 220 of the groove 216, and thereby define a radial gap 254 between two adjacent radial components 248 to permit a fluid to flow past the inner diameter surface 242 of the sealing element 206. The radial components 248 may demonstrate sufficient resilience to counter the compressive force acting on the seal body 236 by the female shaft 204 and maintain the radial gaps 254 between the inner diameter surface 242 of the seal body 236 and the surface or base 220 of the groove 216.

As shown in FIG. 4, the axial components 250 may abut or otherwise come into contact with the groove walls or ridges 218 via the respective axial mounting faces 258 thereby keeping the seal body 236 (e.g., leading side 244 and trailing side 246) from pressing on the groove ridges 218. The axial components 250 thereby prevent the seal body 236 from generating an axial seal via engagement of the leading side 244 and/or the trailing side 246 with the groove ridges 218. The interaction of the axial components 250 with the groove ridges 218 may define an axial gap 258 extending in the circumferential direction on the leading side 244 and the trailing side 246 between the leading and trailing side 244 and the corresponding inner walls of the groove ridge 218.

The axial gaps 258 create flow-through channels for a lubricant to flow past the leading side 244 and trailing side 246, as discussed below.

Additionally, the axial components 250 function to keep the sealing element 206 aligned in the groove 216 during assembly and axially aligned during operation. That is, the axial components 250 may interact with the inner walls of the groove 216 (e.g., the inner walls of the ridges 218) to prevent the sealing element 206 from contorting or rolling out of position during assembly and/or operation. Thus, the axial components 250 maintain the sealing element 206 in proper operating position (e.g., centered within the groove 216), discarding the need to fix the sealing element 206 in the groove 216 via an adhesive such as epoxy.

Figure 5:
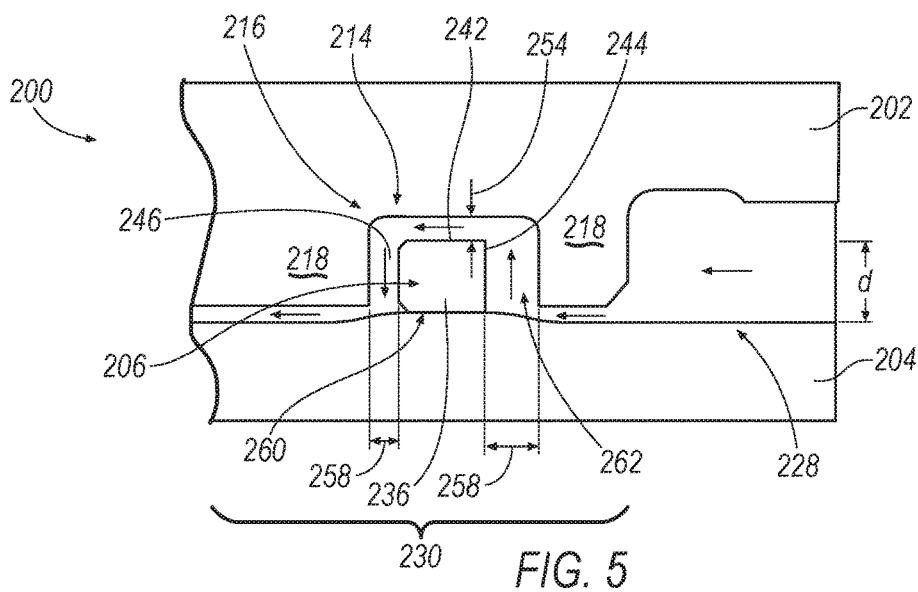
FIG. 5 illustrates a cross-sectional view of the spline joint assembly of FIG. 4, depicting an exemplary fluid flow during a mode of operation.

FIG. 5 illustrates a cross-sectional view of the exemplary spline joint assembly 200 during a mode of operation. In the illustrated example, the projections 238 are not shown for clarity purposes. The exemplary sealing element 206 is disposed at an interface 230 between the male shaft 202 and the female shaft 204 to control a fluid flow of a lubricating fluid, e.g., oil. According to the example illustrated in FIG. 5, the fluid flow (indicated by arrows) may be configured to flow axially in a direction away from the splined portions 208, 222 of the male and female shaft 202, 204, respectively (e.g., downstream the splined portions 208, 222). The sealing element 206 may be mounted in the groove 216 on the inner, male shaft 202 via the projections 238 circumferentially spaced along the inner diameter surface 242 and leading/trailing sides 244, 246 of the seal body 236. The projections 238 function to both mount the seal body 236 in the groove 216 and align the seal body 236 in the groove 216, thereby removing the necessity of an adhesive or epoxy to secure the sealing element 206 in position within the groove 216. That is, the radial components 248 lift the inner diameter surface 242 of the seal body 236 from the base 220 of the groove 216, and the axial components 250 keep the leading side 244 and trailing side 246 of the seal body 236 from pressing against the ridges 218 of the groove 216. In this manner, the projections 238 operate to provide a fluid-flow area or channel by way of the gaps 254 and 258 for the lubricating fluid to flow around the seal body 236.

The outer diameter surface 240 of the seal body 236 (e.g., the sealing portion 232) may squeeze against the inner surface 228 of the outer, female shaft 204 to generate an outer radial fluid-tight seal 260 relative to the longitudinal center axis A. Additionally, the sealing element 206 may be formed of a material having a density greater than the density of the lubricating fluid, and thus centrifugal (CF) loads incurred from the shafts 202, 204 rotating during operation assist the sealing element 206 in creating the outer radial seal 260. The outer radial seal 260 limits the fluid flow in the axial direction thereby causing the lubricating fluid to dam in a dam region 262 between the leading side 244 and the corresponding ridge 218 of the groove 216. As such, the lubricating fluid accumulates upstream the sealing element 206 keeping the splined portions 208, 222 sufficiently lubricated.

The radial components 248 and the axial components 250 provide flow-through channels or fluid-flow areas via the radial gaps 254 and axial gaps 258. As the fluid flow is limited by the outer radial seal 260 causing the lubricating fluid to dam in the dam region 262, the fluid flow changes direction to flow in the radial direction inwards towards the longitudinal center axis A via the axial gap 258 on the leading side 244. The fluid flow then proceeds axially across the inner diameter surface 242 via the radial gaps 254 and radially outwards and out of the interface 230 via the axial gap 258 on the trailing side 246. Accordingly, the projections 238 allow the lubricating fluid to flow-through around the sealing body 236 allowing any accumulated debris and/or heated lubricating fluid to be removed and replaced by an inflow of cleaner, cooler lubricating fluid. As such, the sealing element 206 via the projections 238 permit flow-through lubrication for the splines 212 of the male and female shafts 202, 204, a particularly advantageous feature for spline joint assemblies 200 with highly loaded splines 212 and/or splines 212 operating in high temperature conditions. Consequently, wear and corrosion is reduced on the splines 212 thereby increasing the useful life of the spline joint assembly 200.

Pursuant to one implementation, the radial extent of the seal body 236 may control the depth D of the lubricating fluid in the dam region 262 to ensure that the spline teeth are sufficiently submerged in lubricating fluid. Stated alternatively, the inner diameter of the seal body 236, defined by the inner diameter surface 242, may influence the depth D of the fluid flow of lubricating fluid. For example, decreasing the inner diameter of the seal body 236 (and therefore increasing the radial extent) may correspondingly increase the depth D of the fluid flow of lubricating fluid. That is, since the outer diameter of the seal body 236 is predetermined to correspond to the inner diameter surface 228 of the female shaft 204, decreasing the inner diameter of the seal body 236 proportionately increases the radial extent of the seal body 236 and consequently increases the depth D of the dam region 262, or vice versa. Thus, the sealing element 206, via the seal body 236, may be configured to control the depth D of the fluid flow of lubricating fluid as a function of the inner diameter of the seal body 236 defined by the inner diameter surface 242 and/or the radial extent of the seal body 236.

Therefore, the sealing element 206 is configured to dam a fluid flow of a lubricating fluid to ensure sufficient lubricant is retained upstream to cover the splined portion 208, 222 of the male and female shafts 202, 204 while allowing the lubricating fluid to flow through via the radial gaps 254 and axial gaps 258 providing cooling and removal of potentially damaging debris. The projections 238 may function to mount the sealing element 206 within a groove 216 on one of the shafts 202, 204 to keep the sealing element 206 aligned (e.g., centered) in the groove 216 during assembly and axially aligned during operation. As such, the sealing element 206 can be formed more compact and does not require an adhesive for installation thereby allowing the sealing element 206 to fit into existing grooves 216 intended for other dissimilar seals.

It will be appreciated that the aforementioned method and devices may be modified to have some components and steps removed, or may have additional components and steps added, all of which are deemed to be within the spirit of the present disclosure. Even though the present disclosure has been described in detail with reference to specific examples, it will be appreciated that the various modifications and changes can be made to these examples without departing from the scope of the present disclosure as set forth in the claims. The specification and the drawings are to be regarded as an illustrative thought instead of merely restrictive thought.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Likewise, the use of the words "first", "second", etc. may be interchangeable.

What is claimed is:

1. A shaft coupling, comprising:
   an inner male shaft having a circumferential outer surface received in an outer female shaft having a circumferential inner surface, the male shaft interacting with the female shaft at an interface;
   an annular groove disposed on the male shaft at the interface, the groove defining a surface extending circumferentially around the male shaft;
   a sealing element arranged in the groove, the sealing element including:
   an annular seal body, defining an inner mounting face and a radially opposite outer sealing face, and a leading face and an axially opposite trailing face, relative to a center axis of the seal body;
   a plurality of projections circumferentially spaced on the seal body, each projection including:
   (i) a radial component extending radially inwards from the mounting face in a radial direction of the center axis, the radial component mounting the seal body to the surface of the groove thereby lifting the mounting face from the surface of the groove, and
   (ii) an axial component extending axially from the leading face and the trailing face in an axial direction of the center axis, wherein the axial component of the plurality of projections is structured and arranged to engage opposing walls of the groove and prevent the leading face and the trailing face from pressing against the opposing walls of the groove;
   wherein the sealing face of the seal body abuts the inner surface of the female shaft at the interface;
   wherein a plurality of radial gaps are defined between the mounting face of the seal body and the surface of the groove, the radial gaps configured to permit a lubricating fluid to flow around the mounting face of the seal body; and
   wherein the axial components of adjacent projections engage with the opposing walls of the groove such to define first axial gaps between the leading face and a corresponding inner wall surface of the groove and second axial gaps between the trailing face and another corresponding inner wall surface of the groove, the axial gaps configured to permit a lubricating fluid to flow around the leading face and the trailing face of the seal body.

2. The shaft coupling of claim 1, wherein at least one of (i) the axial component engages opposing walls of the groove to axially center the seal body within the groove, and (ii) opposing outer axial ends of the axial component contact corresponding inner wall surfaces of the groove to prevent the sealing element from forming an axial seal at least in one region of the seal body.

3. The shaft coupling of claim 1, wherein the sealing face is an outer diameter of the seal body and generates an outer radial seal with the inner surface of the female shaft to dam a fluid flow of a lubricating fluid.

4. The shaft coupling of claim 1, wherein the sealing element is composed of a material having a density greater than or equal to a density of a lubricating fluid associated therewith.

5. The shaft coupling of claim 4, wherein the sealing element is configured to control a depth of a fluid flow as a function of at least one of a radial extent of the seal body and an inner diameter defined by the mounting face of the seal body.

6. The shaft coupling of claim 1, wherein the seal body is composed of a material different from the plurality of projections.

7. A spline joint assembly for a gas turbine engine, comprising:
- a male shaft including a splined portion having rows of splines and an annular groove axially spaced therefrom, the groove defining a surface extending circumferentially around the male shaft;
- a sealing element disposed in the groove and including:
- an annular seal body defining an outer diameter face and a radially opposite inner diameter face, and a leading side and an axially opposite trailing side, relative to a center axis of the seal body;
- a plurality of projections circumferentially spaced on the seal body, the plurality of projections each respectively including:
  (i) a radial component extending radially inwards from the inner diameter face towards the center axis, the radial component mounting the seal body in the groove thereby lifting the inner diameter face from the surface of the groove, and
  (ii) an axial component extending axially from the leading side and the trailing side of the seal body, wherein the axial component of the plurality of projections is structured and arranged to seat within opposing walls of the groove and prevent the leading side and the trailing side from pressing against the opposing walls of the groove;
- a plurality of radial gaps defined between the inner diameter face of the seal body and the surface of the groove, the radial gaps configured to permit a lubricating fluid to flow around the inner diameter face of the seal body; and
- a plurality of first axial gaps defined between the leading side and a corresponding inner wall surface of the groove and a plurality of second axial gaps defined between the trailing side and another corresponding inner wall surface of the groove, wherein the first axial gaps and the second axial gaps are provided by the axial components of two adjacent projections engaging with the opposing walls of the groove and permit the lubricating fluid to flow around the leading side and the trailing side of the seal body, respectively.

8. The assembly of claim 7, further comprising a female shaft arranged concentrically around the male shaft, wherein the outer diameter face of the seal body abuts an inner surface of the female shaft to form an outer radial seal relative to the center axis to dam the lubricating fluid at the leading side of the seal body.

* * * * *